United States Patent
Inoue (10) Patent No.: US 10,763,710 B2
(45) Date of Patent: Sep. 1, 2020

(54) STATOR FOR ROTARY ELECTRIC MACHINE

(71) Applicant: HONDA MOTOR CO., LTD., Tokyo (JP)

(72) Inventor: Masashi Inoue, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 168 days.

(21) Appl. No.: 16/004,719

(22) Filed: Jun. 11, 2018

(65) Prior Publication Data

US 2018/0358848 A1    Dec. 13, 2018

(30) Foreign Application Priority Data

Jun. 13, 2017   (JP) ................. 2017-116087

(51) Int. Cl.
  *H02K 1/18*   (2006.01)
  *H02K 5/24*   (2006.01)

(52) U.S. Cl.
  CPC ............ *H02K 1/185* (2013.01); *H02K 5/24* (2013.01)

(58) Field of Classification Search
  CPC .................. H02K 1/185; H02K 5/24
  See application file for complete search history.

(56) References Cited

U.S. PATENT DOCUMENTS 2,993,715 A * 7/1961 Hutton .................. F16C 11/083
                                                         403/224
4,358,098 A * 11/1982 Ceseri ................... F16F 1/3732
                                                         267/141.5
5,027,026 A    6/1991 Mineta et al.
2012/0242186 A1   9/2012 Hattori

FOREIGN PATENT DOCUMENTS

| CN | 102687372 A | | 9/2012 |
| JP | H01-157565 U | | 10/1989 |
| JP | 2000-350397 A | | 12/2000 |
| JP | 2002-136043 A | | 5/2002 |
| JP | 2005-218169 A | | 8/2005 |
| JP | 2008-199845 A | | 8/2008 |
| JP | 2008199845 A | * | 8/2008 |
| JP | 4464697 B2 | | 5/2010 |
| JP | 2011-019400 A | | 1/2011 |
| JP | 2011019400 A | * | 1/2011 |
| JP | 2015-089233 A | | 5/2015 |

* cited by examiner

*Primary Examiner* — Jue Zhang (74) *Attorney, Agent, or Firm* — Paratus Law Group, PLLC (57) ABSTRACT

A stator includes a stator core, a through hole provided in the stator core, and a insertion member which is fitted into the through hole and has an insertion space, through which a bolt passes. The insertion member includes an outer circumferential member to be fitted in the through hole, an inner circumferential member including a hollow portion forming the insertion space, and an elastic member provided between the outer circumferential member and the inner circumferential member. A lower end portion of the inner circumferential member further protrudes downwardly compared to a lower end surface of the outer circumferential member and a lower end surface of the stator core, and an upper end portion of the inner circumferential member further protrudes upwardly compared to an upper end surface of the outer circumferential member and an upper end surface of the stator core.

7 Claims, 12 Drawing Sheets

STATOR FOR ROTARY ELECTRIC MACHINE

CROSS-REFERENCE TO RELATED APPLICATION

The present application claims the benefit of priority of Japanese Patent Application No. 2017-116087, filed on Jun. 13, 2017, the content of which is incorporated herein by reference.

BACKGROUND

1. Field of the Invention

The present invention relates to a stator for a rotary electric machine.

2. Description of the Related Art

Recently, a vehicle including a rotary electric machine such as a motor as a power source has been developed, for example, an electric vehicle or a hybrid vehicle. Generally, a stator of such a rotary electric machine is fixed to a housing by bolt-fastening.

In JP-A-2015-89233, a stator is described which is fixed to a housing by bolt-fastening. The stator includes a fastening portion through which a bolt for fastening passes, and the fastening portion is provided with a slit. With the action of the slit, it is prevented that an annular ring vibration mode occurs in the stator.

In JP-A-2002-136043, a motor anti-vibration mechanism is described which prevents vibrations from being transmitted to a steering from a motor in an electric power steering device.

The motor anti-vibration mechanism is configured such that a flange of the motor is bolt-fastened to the steering device via a rubber anti-vibration mount.

In a vehicle including a rotary electric machine as a power source, there is an important problem to attenuate vibrations to be transmitted to a housing, in which the stator is fixed, from a stator of the rotary electric machine in improving comfort related to vibrations and sound of the vehicle.

In JP-A-2015-89233, it is not considered to attenuate the vibrations to be transmitted to the housing from the stator.

In the motor anti-vibration mechanism described in JP-A-2002-136043, a bolt fastening axial force is received by the rubber anti-vibration mount. In a motor serving as a power source of a vehicle, a stator core is exposed to oil and a high temperature environment.

For this reason, in a case where the motor anti-vibration mechanism is applied to the motor as a power source of a vehicle, it is not possible to sufficiently secure the bolt fastening axial force due to the creep of the rubber anti-vibration mount.

SUMMARY

An object of the invention is to provide a stator of a rotary electric machine which is capable of preventing vibrations being transmitted from the stator to a housing while securing a bolt fastening axial force of the stator with respect to the housing.

According to a first aspect of the invention, there is provided a stator of a rotary electric machine to be fixed to a housing with a bolt, including: an annular stator core; a through hole provided in the stator core along an axial direction of the stator; and a insertion member having a cylindrical shape, the insertion member being fitted into the through hole and has an insertion space, through which the bolt passes, wherein: the insertion member includes: an outer circumferential member having a cylindrical shape, to be fitted into the through hole; an inner circumferential member, having a cylindrical shape, including a hollow portion forming the insertion space; and an elastic member provided between the outer circumferential member and the inner circumferential member; a first end portion on one side in the axial direction of the inner circumferential member further protrudes in the axial direction compared to end surfaces on one side in the axial direction of the outer circumferential member and the stator core, and comes into contact with the housing in a state where the stator is fixed to the housing; and a second end portion on the other side in the axial direction of the inner circumferential member further protrudes in the axial direction compared to end surfaces on the other side in the axial direction of the outer circumferential member and the stator core, and comes into contact with a bolt head of the bolt in a state where the stator is fixed to the housing.

According to a second aspect of the invention, the stator of the rotary electric machine according to the first aspect, wherein a length of the inner circumferential member in the axial direction is set to be longer than that of the elastic member in the axial direction.

According to a third aspect of the invention, the stator of the rotary electric machine according to the second aspect, wherein the second end portion of the inner circumferential member includes a cylindrical portion and a flange protruding outwardly in a radial direction from an outer circumferential portion of the cylindrical portion and being in non-contact with the stator core and the outer circumferential member.

According to a fourth aspect of the invention, the stator of the rotary electric machine according to the third aspect, wherein an outer diameter of the flange is set to be equal to or larger than that of the elastic member.

According to a fifth aspect of the invention, the stator of the rotary electric machine according to any one of the first to fourth aspects, wherein the stator core is formed of a stacked body of a plurality of steel sheets.

According to a sixth aspect of the invention, the stator of the rotary electric machine according to the fifth aspect, wherein an outer circumferential surface of the outer circumferential member is formed with a plurality of convex portions or concave portions extending in the axial direction along a circumferential direction.

According to a seventh aspect of the invention, the stator of the rotary electric machine according to any one of the first to sixth aspects, wherein: the stator core includes a plurality of through holes and a plurality of insertion members; and a plurality of insertion members, one of which is the insertion member; and a number of the insertion members is less than a number of the through holes.

According to the stator of the rotary electric machine according to the first aspect, in the state where the first end portion of the inner circumferential member comes into contact with the housing, and the second end portion of the inner circumferential member comes into contact with the bolt head, the stator is fixed to the housing with the bolt, so that the inner circumferential member is interposed between the housing and the bolt head.

As a result, since the bolt fastening axial force is transmitted to the housing via the inner circumferential member, it is possible to sufficiently secure the bolt fastening axial force of the stator with respect to the housing.

In addition, since the first end portion protrudes in the axial direction further than the one end surfaces in the axial direction of the outer circumferential member and the stator core, and the second end portion protrudes in the axial direction further than the other end surfaces in the axial direction of the outer circumferential member and the stator core, in a state where the stator is fixed to the housing, a gap is formed between the housing and the stator core and the outer circumferential member, and between the bolt head and the stator core and the outer circumferential member.

For this reason, it is possible to prevent the vibrations from being transmitted from the stator core and the outer circumferential member to the housing. In addition, since the vibrations of the stator core and the outer circumferential member are attenuated by the elastic member, it is possible to prevent that the vibrations of the stator core and the outer circumferential member are transmitted to the housing.

According to the stator of the rotary electric machine according to the second aspect, in the state where the stator is fixed to the housing, a gap can be formed between the bolt head or the housing and the elastic member. Therefore, it is possible to prevent a bolt fastening axial force from being transmitted to the elastic member, thereby improving the durability of the elastic member.

According to the stator of the rotary electric machine according to the third aspect, in the state where the stator is fixed to the housing, the elastic member can be disposed in the space interposed between the flange of the inner circumferential member and the housing. For this reason, even when the elastic member is peeled off, it is possible to prevent the elastic member from coming off to the outside of the through hole.

According to the stator of the rotary electric machine according to the fourth aspect, even when the elastic member is peeled off, the coming-off of the elastic member to the outside of the through hole can be further reliably prevented.

According to the stator of the rotary electric machine according to the fifth aspect, it is possible to correct the positional deviation between the steel sheets caused at the time of manufacturing the stator core including the through hole by fitting the insertion member into the through hole of the manufactured stator core. Therefore, it is possible to improve a magnetic characteristics of the stator, thereby further attenuating vibrations.

According to the stator of the rotary electric machine according to the sixth aspect, it is possible to reduce the stress to be transmitted to the stator core from the insertion member, and the magnetic characteristics of the stator can be improved, thereby further attenuating vibrations.

According to the stator of the rotary electric machine according to the seventh aspect, it is possible to reduce the number of the insertion members, thereby realizing cost reduction.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
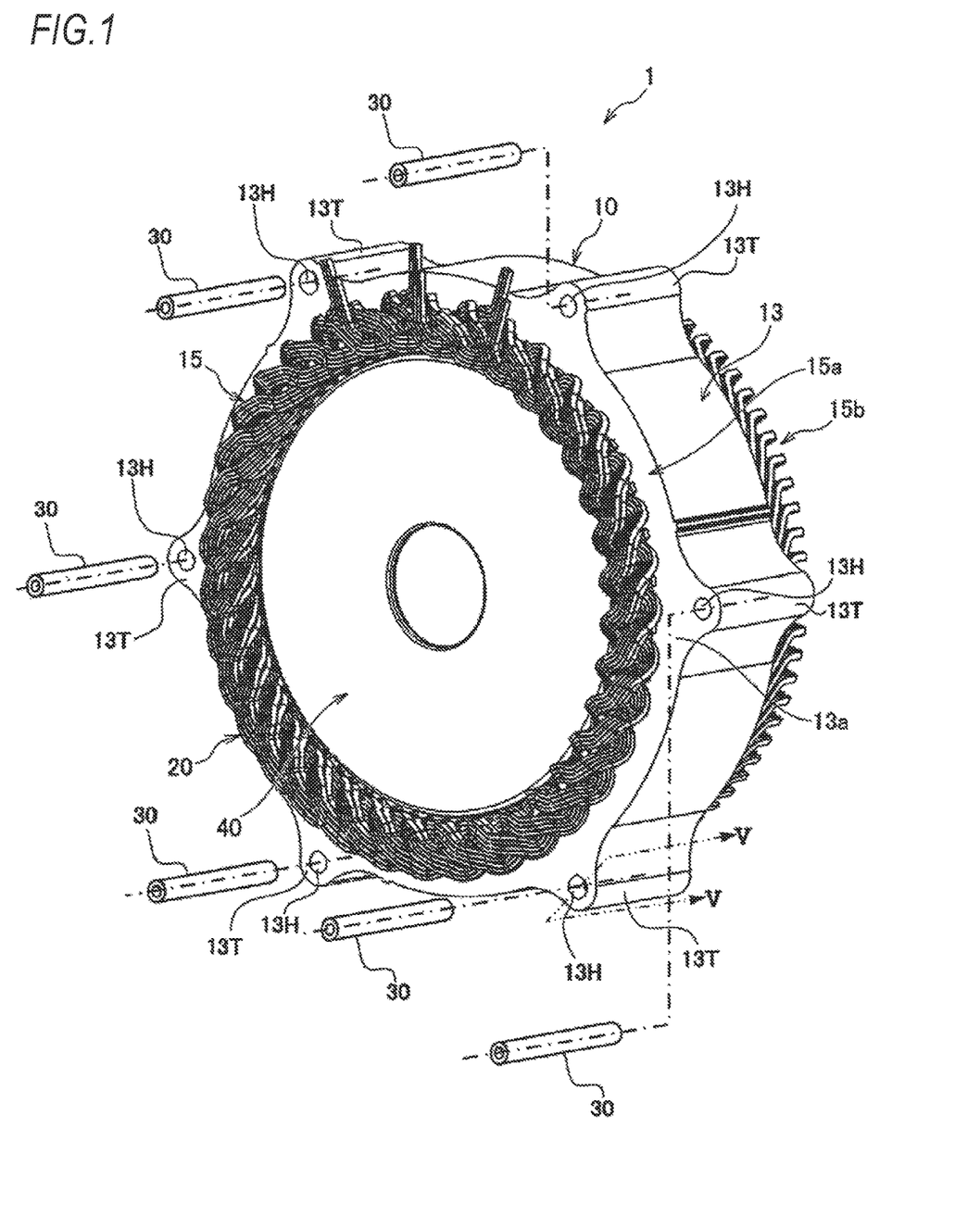
FIG. 1 is a perspective view schematically illustrating a configuration of a rotary electric machine mounted with a stator according to an embodiment of the invention.

FIG. 1 is a perspective view schematically illustrating a configuration of a rotary electric machine 1 mounted with a stator 10 according to an embodiment of the invention.

The rotary electric machine 1 is a so-called inner-rotor rotary electric machine, and includes the stator 10 and a rotor 40 disposed on the inner circumferential portion of the stator 10.

The stator 10 includes an annular stator core 13 formed of a stacked body in which a plurality of steel sheets are stacked and a stator coil 15 consisted of a plurality of coil segment groups 20 and attached to the stator core 13.

The stator core 13 includes a plurality of bolt fastening portions 13T (six in the example illustrated in FIG. 1) bulging outwardly in a radial direction of the stator core 13.

The six bolt fastening portions 13T are arranged at regular intervals along a circumferential direction of the stator core 13.

The bolt fastening portions 13T are portions for fixing the stator 10 with bolts 70 (see FIG. 5) with respect to the housing made of resin, metal, or the like which is not illustrated in the drawing.

In the bolt fastening portions 13T, cylindrical through holes 13H are formed to penetrate the stator core 13 along the axial direction of the stator 10.

Into each of the through holes 13H, a cylindrical insertion member 30 is fitted which has an insertion space SP, through which the bolt 70 passes, described above.

In the stator core 13, a plurality of slots 14 (see FIGS. 2 and 3) are formed to penetrate in the axial direction of the stator 10 on the inner circumferential portion, and the slots 14 are arranged at a predetermined interval in the circumferential direction.

Hereinafter, the stator coil 15 attached to the slots 14 of the stator core 13 will be described with reference to FIGS. 2 to 4.

Figure 2:
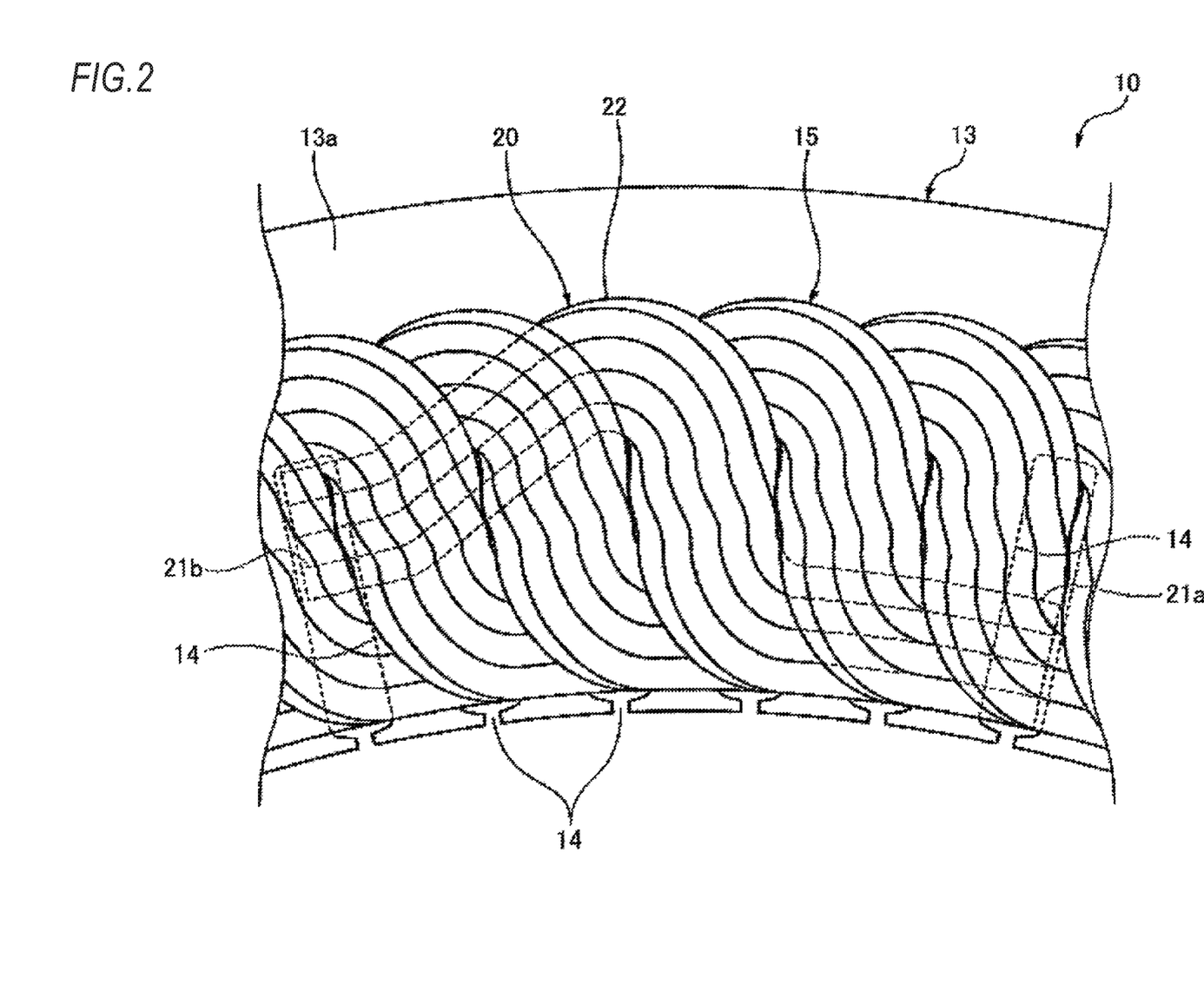
FIG. 2 is a partially enlarged front view illustrating a coil end of the stator illustrated in FIG. 1.

FIG. 2 is a partially enlarged front view illustrating a coil end 15a of the stator 10 illustrated in FIG. 1. FIG. 3 is a partially enlarged perspective view illustrating a coil end 15b of the stator 10 illustrated in FIG. 1. FIG. 4 is a perspective view illustrating one coil segment group 20 of the stator coil 15 of the stator 10 illustrated in FIG. 1.

Figure 4:
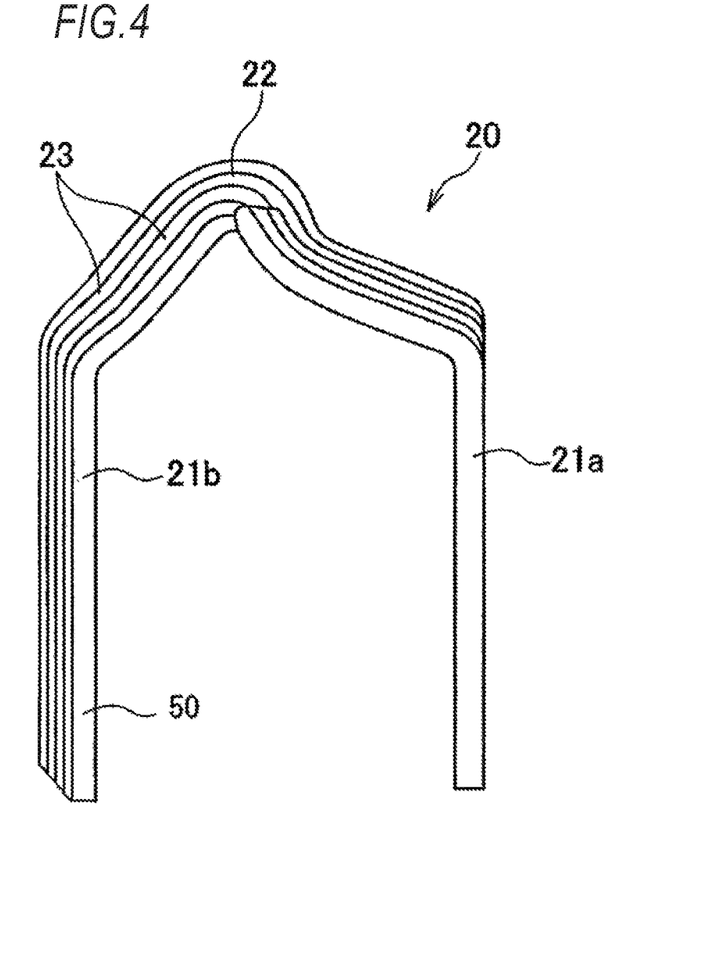
FIG. 4 is a perspective view illustrating one coil segment group of the stator coil of the stator illustrated in FIG. 1.

The stator coil 15 is formed by a plurality of coil segment groups 20 in which a substantially U-shaped coil segment 23 illustrated in FIG. 4 forms a bundle such that every four coil segments are aligned in a row.

The coil segment 23 is formed of a flat wire 50 which has a rectangular cross section and includes a pair of leg portions 21a and 21b extending in parallel to each other and a connecting portion 22 which connects one ends of the leg portion 21a and the leg portion 21b.

As illustrated in FIG. 2, one leg portion 21a of each coil segment 23 of the coil segment group 20 is inserted into a radially inner-side portion of a specific slot 14.

The other leg portion 21b of each coil segment 23 of the coil segment group 20 is inserted into a radially outer-side portion of another slot 14 which is positioned to be separated from the above-described specific slot 14 by a predetermined number of slots.

As described above, when the plurality of coil segment groups 20 are inserted into the slots 14 of the stator core 13, eight coil segments 23 are disposed in one slot 14 in this embodiment.

In addition, as illustrated in FIG. 2, on one end side of the stator core 13 in the axial direction, the connecting portions 22 of the plurality of coil segment groups 20 are formed to be continuous in the circumferential direction, and the adjacent connecting portions 22 in the circumferential direction are disposed to be partially overlapped when viewed from the axial direction, thereby forming the coil end 15a.

Figure 3:
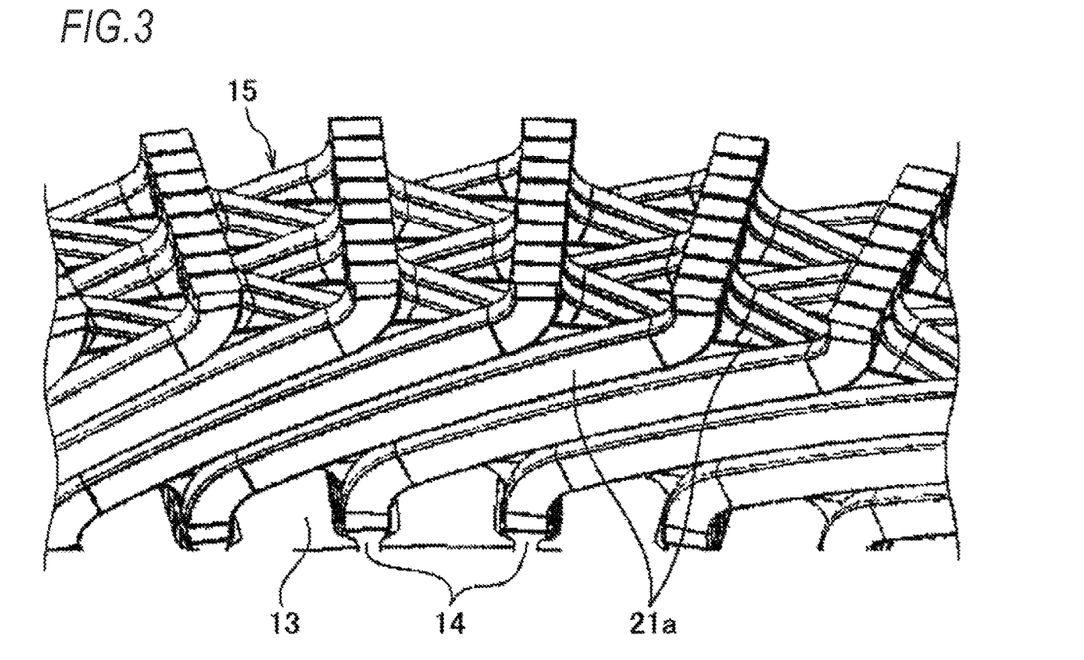
FIG. 3 is a partially enlarged perspective view illustrating a coil end of the stator illustrated in FIG. 1.

Furthermore, as illustrated in FIG. 3, on the other end side of the stator core 13 in the axial direction, the leg portions 21a and 21b protruding from the slots 14 are folded and bent in the circumferential direction of the stator core 13 to be joined with the same phase coils, thereby forming the coil end 15b.

In this embodiment, a leg portion 21a of the coil segment 23 positioned on the radially innermost-side is folded and bent in one side in the circumferential direction. Leg portions 21a and 21a of two coil segments 23, which are positioned on the outer diameter side of the coil segment 23 positioned on the radially innermost-side, are folded and bent in the other side in the circumferential direction. Leg portions 21a and 21a of two coil segments 23, which are positioned on the more outer diameter side of the coil segment 23 positioned on the radially innermost-side, are folded and bent in the one side in the circumferential direction.

Figure 5:
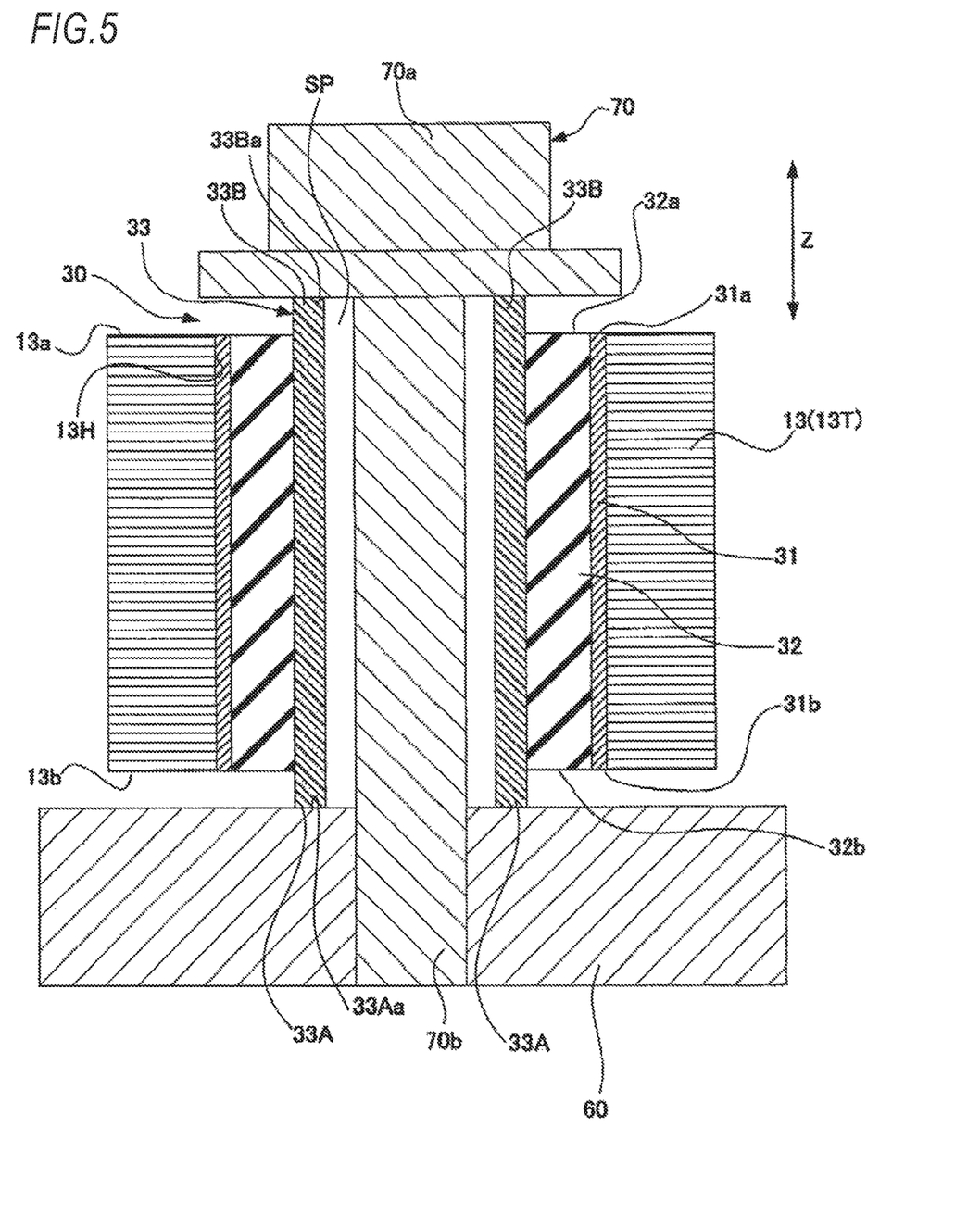
FIG. 5 is a schematic cross-sectional view taken along line V-V of FIG. 1 illustrating a state where the stator illustrated in FIG. 1 is fixed to a housing with a bolt.

FIG. 5 is a schematic cross-sectional view taken along line V-V of FIG. 1 illustrating the stator 10 along the axial direction Z in a state where the stator 10 illustrated in FIG. 1 is fixed to the housing with the bolt.

When a straight line is set which equally divides the respective components illustrated in FIG. 5 into two, portions located lower than the straight line in the drawing are defined as one-side portions in the axial direction Z of the components, and portions located upper than the straight line in the drawing are defined as the other-side portions in the axial direction Z of the components.

The insertion member 30 includes a cylindrical outer circumferential member 31 which is made of metal, resin having rigidity, or the like and is fitted into the through hole 13H, a cylindrical inner circumferential member 33 which is made of metal, resin having rigidity, or the like and has a hollow portion, and a cylindrical elastic member 32 which is provided between the outer circumferential member 31 and the inner circumferential member 33 and is formed of an elastic body such as rubber.

The inner diameter of the outer circumferential member 31 is formed to be almost the same as the outer diameter of the elastic member 32, and the inner diameter of the elastic member 32 is formed to be almost the same as the outer diameter of the inner circumferential member 33. By the hollow portion of the inner circumferential member 33, the insertion space SP, through which the shaft portion 70b of the bolt 70 passes, is formed.

The length of the outer circumferential member 31 in the axial direction Z is set to be the same as that of the through hole 13H in the axial direction Z. The upper end surface 31a of the outer circumferential member 31 on the upper side in the axial direction Z is located at the same position as the upper end surface 13a of the stator core 13 (the bolt fastening portion 13T) on the upper side in the axial direction Z. The lower end surface 31b of the outer circumferential member 31 on the lower side in the axial direction Z is located at the same position as the lower end surface 13b of the stator core 13 (the bolt fastening portion 13T) on the lower side in the axial direction Z.

The length of the elastic member 32 in the axial direction Z is set to be the same as that of the through hole 13H in the axial direction Z. The upper end surface 32a of the elastic member 32 on the upper side in the axial direction Z is located at the same position as the upper end surface 13a of the stator core 13 (the bolt fastening portion 13T). The lower end surface 32b of the elastic member 32 on the lower side in the axial direction Z is located at the same position as the lower end surface 13b of the stator core 13 (the bolt fastening portion 13T).

In this specification, the expression "two lengths are the same" means that the difference between the two lengths falls within the range of tolerance around 0. In addition, the expression "two positions in the axial direction Z are the same" means that the difference between the two positions falls within the range of tolerance around 0.

The length of the inner circumferential member 33 in the axial direction Z is set to be longer than that of the through hole 13H in the axial direction Z (in the example illustrated in FIG. 5, the length the inner circumferential member 33 in the axial direction Z is set to be the same as that of each of the elastic member 32 and the outer circumferential member 31 in the axial direction Z).

The lower end portion 33A of the inner circumferential member 33 on the lower side in the axial direction Z protrudes further downwardly in the axial direction compared to the lower end surface 32b of the elastic member 32, the lower end surface 31b of the outer circumferential member 31, and the lower end surface 13b of the stator core 13.

The upper end portion 33B of the inner circumferential member 33 on the upper side in the axial direction Z protrudes further upwardly in the axial direction compared to the upper end surface 32a of the elastic member 32, the upper end surface 31a of the outer circumferential member 31, and the upper end surface 13a of the stator core 13.

That is, the lower end surface 33Aa of the inner circumferential member 33 on the lower side in the axial direction Z and the upper end surface 33Ba of the inner circumferential member 33 on the upper side in the axial direction Z are located at the outer sides in the axial direction of the through hole 13H, respectively.

The stator 10 having the above-described configuration is mounted on the housing 60 in a state where the lower end surface 33Aa of the inner circumferential member 33 faces the surface of the housing 60. In this state, the shaft portion 70b of the bolt 70 is inserted into the insertion space SP of the insertion member 30 from the side of the upper end portion 33B of the inner circumferential member 33 toward the side of the lower end portion 33A.

Thereafter, the tip end of the shaft portion 70b is screwed into the screw hole formed in the housing 60, thereby fastening the bolt 70. As a result, the inner circumferential member 33 is interposed between the bolt head 70a of the bolt 70 and the housing 60, so that the fixed state illustrated in FIG. 5 is made in which the stator 10 is fixed to the housing 60.

As illustrated in FIG. 5, in the fixed state, the upper end surface 33Ba of the inner circumferential member 33 constitutes a bolt head contact surface contacting with the bolt head 70a. In addition, in the fixed state, the lower end surface 33Aa of the inner circumferential member 33 constitutes a housing contact surface contacting with the housing 60.

The lower end portion 33A of the inner circumferential member 33 of the insertion member 30 protrudes further downwardly compared to the lower end surface 32b of the elastic member 32, the lower end surface 31b of the outer circumferential member 31, and the lower end surface 13b of the stator core 13, and the upper end portion 33B of the inner circumferential member 33 of the insertion member 30 protrudes further upwardly compared to the upper end surface 32a of the elastic member 32, the upper end surface 31a of the outer circumferential member 31, and the upper end surface 13a of the stator core 13.

For this reason, in the fixed stated illustrated in FIG. 5, only the inner circumferential member 33 among the components of the stator 10 contacts with the bolt head 70a and the housing 60, but the stator core 13 and the outer circumferential member 31 do not contact with the bolt head 70a and the housing 60.

In addition, the inner circumferential member 33 does not contact with the stator core 13 and the outer circumferential member 31. Further, the elastic member 32 is provided which can attenuate the vibrations from the stator core 13 between the outer circumferential member 31 contacting with the stator core 13 and the inner circumferential member 33.

Therefore, according to the stator 10, the vibrations from the stator core 13 are attenuated by the elastic member 32, so that it is possible to prevent the vibrations from the stator core 13 form being transmitted to the housing 60.

In the stator 10, the inner circumferential member 33 receives the bolt fastening axial force of the bolt 70. As in the related art, in a case where the bolt fastening axial force acts on a rubber bush, when the rubber bush creeps, the bolt fastening axial force becomes weakened, and the bolt fastening axial force cannot be sufficiently secured.

However, in this embodiment, the inner circumferential member 33 receives the bolt fastening axial force of the bolt 70. As a result, the bolt fastening axial force can be sufficiently secured.

Since the inner circumferential member 33 is made of metal or resin having rigidity, even when the stator 10 is placed in an oil and high temperature environment, it is possible to prevent deterioration of the bolt fastening axial force.

In the fixed stated illustrated in FIG. 5, in the stator 10, a gap is formed between the bolt head 70a and the housing 60 and the elastic member 32, and the bolt fastening axial force is not applied to the elastic member 32 with the action of the gap. Therefore, it is possible to improve the durability of the elastic member 32, thereby improving a vibration prevention effect.

According to the stator 10, the upper end surface 33Ba of the inner circumferential member 33 is located on the further upper side compared to the upper end surface 31a of the outer circumferential member 31 (in other words, the upper end surface 33Ba is located on the outer side in the axial direction of the hollow portion of the outer circumferential member 31).

From this reason, no matter how large the outer diameter of the bolt head 70a, it is possible to prevent that the bolt 70 and the outer circumferential member 31 contact to each other in the fixed state. For example, as illustrated in FIG. 5, it is possible to adopt a bolt having an outer diameter equal to or larger than that of the elastic member 32 as the bolt head 70a.

In a case where such a bolt is adopted, in the fixed state, the elastic member 32 is interposed between the bolt head 70a and the housing 60. Therefore, even when the elastic member 32 is peeled off from the inner circumferential member 33 or the outer circumferential member 31, the bolt head 70a and the housing 60 can retain the peeled-off elastic member 32 in the through hole 13H. As a result, it is possible to prevent the stator core 13 from falling off.

According to the stator 10, the above-described effect can be obtained only by fitting or press-fitting the insertion member 30 into the through hole 13H of the stator core 13. Therefore, it is possible to realize miniaturization and cost reduction of the stator 10.

In addition, part (for example, three through holes 13H) of six through holes 13H of the stator 10 may have a configuration in which the insertion member 30 is removed.

As described above, the insertion member 30 is selectively provided with respect to the six through holes 13H of the stator 10, so that it is possible to precisely control the vibrations to be transmitted to the housing 60, thereby easily realizing a desired performance suitable for a purpose or a request.

According to such a configuration that the insertion members 30 are fitted into only some of the through holes 13H, it is possible to reduce the number of the insertion members 30 and to reduce the manufacturing cost of the stator 10.

Figure 6:
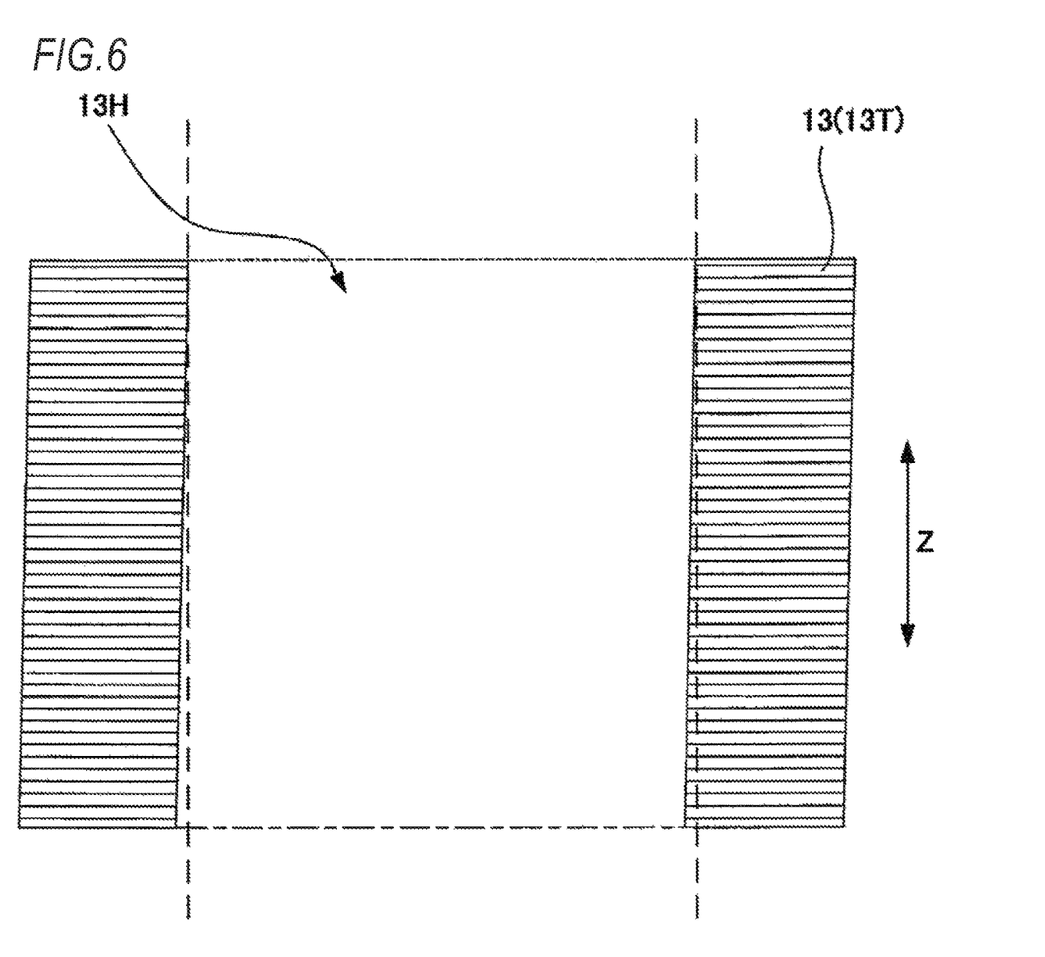
FIG. 6 is a view illustrating an example of a cross section of a through hole in the stator illustrated in FIG. 1.

The stator core 13 of the stator 10 is formed by a stacked body of a plurality of steel sheets as described above. As illustrated in FIG. 6, in the stator core formed by the stacked body, there is a case where the steel sheets are not stacked straight in the axial direction Z due to the positional deviation or the like at the time of joining the steel sheets.

Figure 7:
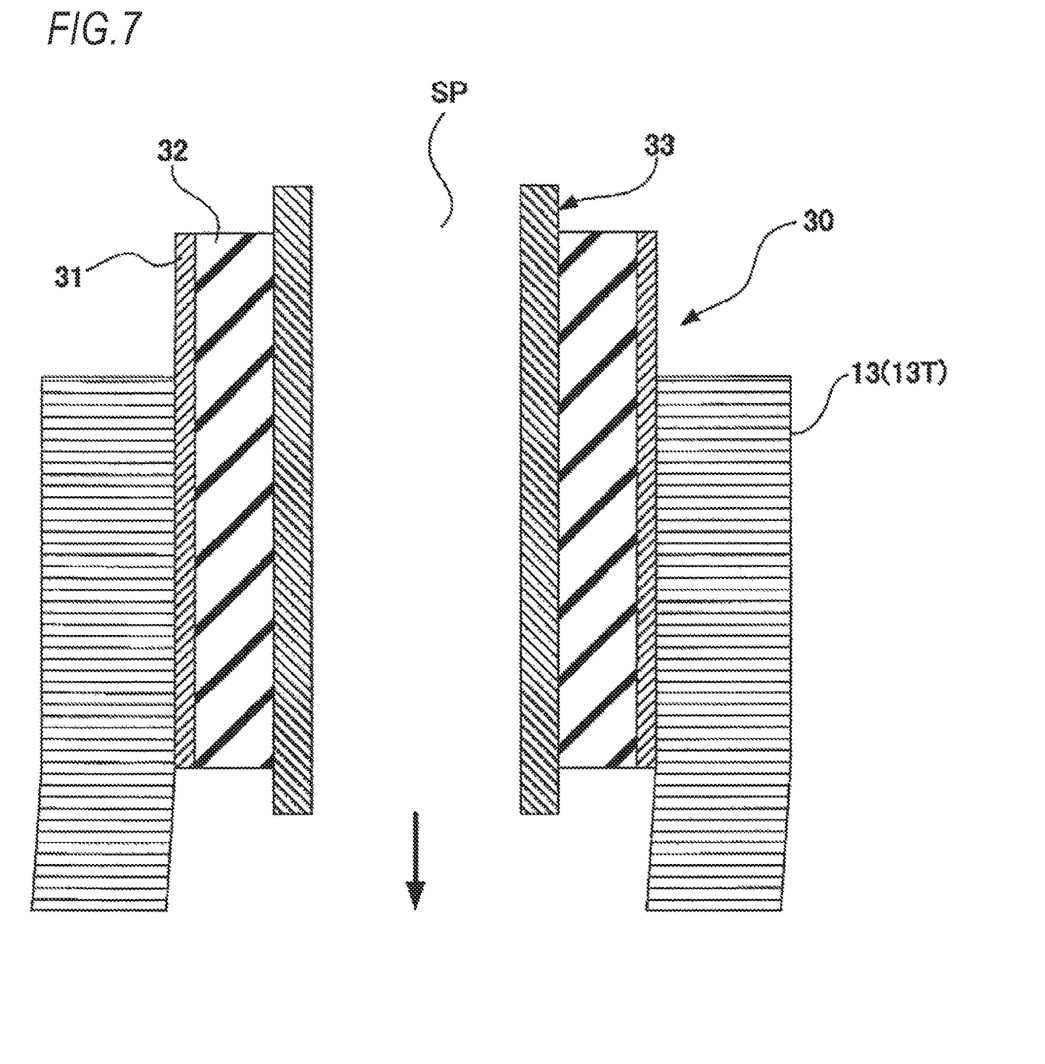
FIG. 7 is a schematic view illustrating a state where an insertion member is inserted into the through hole illustrated in FIG. 6.

Even in this case, by performing a work of fitting the insertion member 30 into the through hole 13H of the stator core 13 after manufacturing the stator core 13, it is possible to correct the shape of the stator core 13 (for example, correct the perpendicularity of the inner diameter of the stator core 13) as illustrated in FIG. 7. According to the stator 10, by adopting such a manufacturing method, it is possible to reduce noise by suppressing magnetic imbalance.

Further, it is assumed to adopt a manufacturing process in which after the stator core 13 is manufactured, the coil segment group 20 is attached to the inner circumferential portion of the stator core 13, and the coil segment group 20 is twisted and bent toward the circumferential direction, so that the stator coil 15 is attached to the stator core 13.

In this case, before the twisting and bending, a work of fitting the insertion member 30 into the through hole 13H of the stator core 13 is performed, so that the positional deviation between the steel sheets due to the twisting and bending can be prevented. Therefore, by adopting the manufacturing method described above, with the stator 10, it is possible to reduce noise by suppressing magnetic imbalance.

The insertion member 30 of the stator 10 can be deformed as described below.

For example, in FIG. 5, the lower end surface 32b of the elastic member 32 may be located at the same position as the lower end surface 33Aa of the inner circumferential member 33.

Even in this configuration, since there is a gap between the upper end surface 32a of the elastic member 32 and the bolt head 70a, it is possible to prevent a bolt fastening axial force from being applied to the elastic member 32. Accordingly, it is possible to improve the durability of the elastic member 32.

In FIG. 5, the upper end surface 32a of the elastic member 32 may be located at the same position as the upper end surface 33Ba of the inner circumferential member 33.

Even in this configuration, since there is a gap between the lower end surface 32b of the elastic member 32 and the housing 60, it is possible to prevent a bolt fastening axial force from being applied to the elastic member 32. Accordingly, it is possible to improve the durability of the elastic member 32.

In addition, in FIG. 5, the upper end surface 32a of the elastic member 32 may be located at the same position as the upper end surface 33Ba of the inner circumferential member 33, and the lower end surface 32b of the elastic member 32 may be located at the same position as the lower end surface 33Aa of the inner circumferential member 33.

That is, the length of the elastic member 32 in the axial direction Z may be the same as that of the inner circumferential member 33 in the axial direction Z.

Even with this configuration, since the bolt fastening axial force is secured by the inner circumferential member 33, it is possible to firmly fix the stator 10 with respect to the housing 60.

Figure 8:
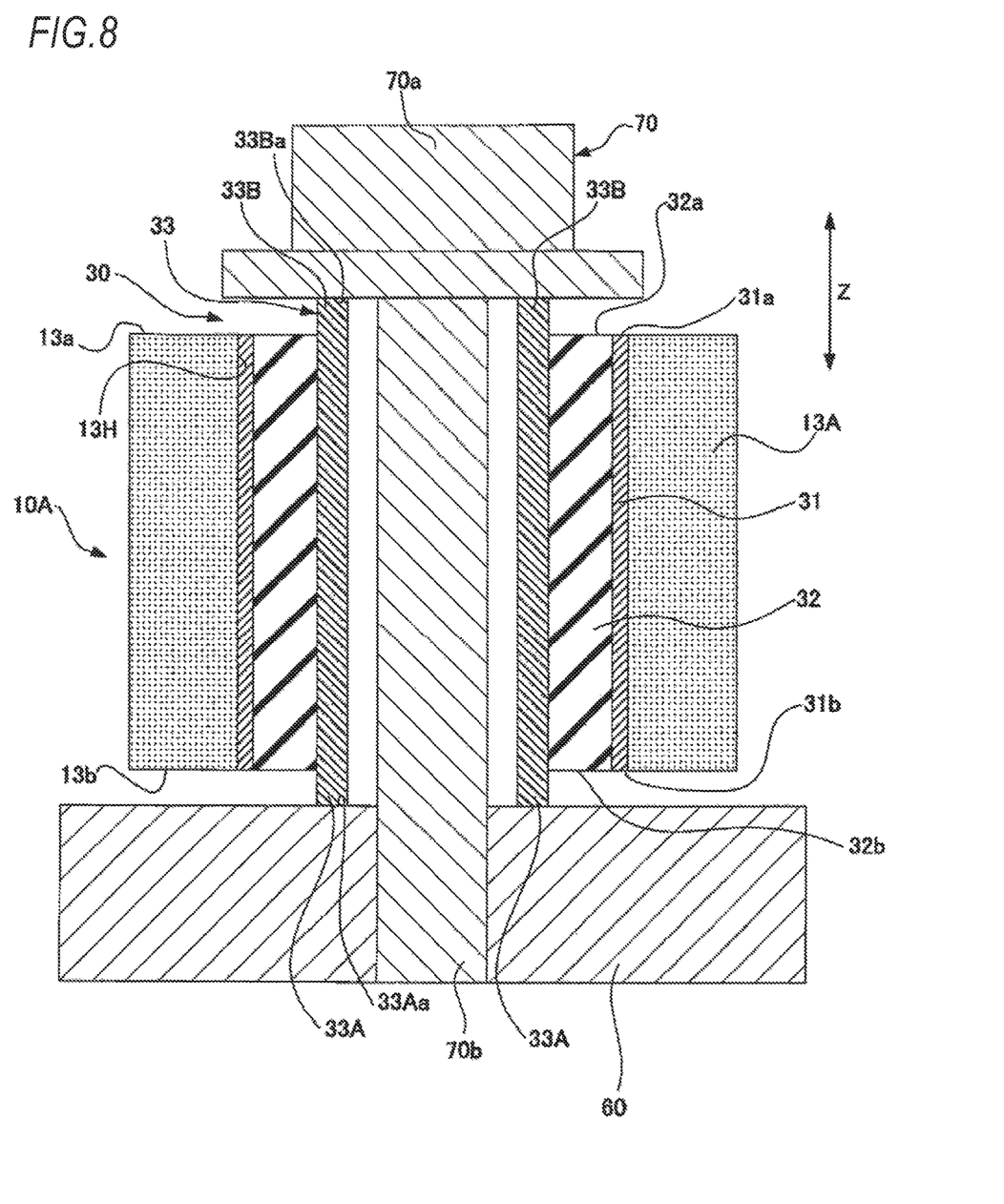
FIG. 8 is a view illustrating one modification example of the stator illustrated in FIG. 1 and corresponding to FIG. 5.

FIG. 8 is a view illustrating a stator 10A, which is one modification example of the stator 10 illustrated in FIG. 1, and corresponding to FIG. 5. The same configurations illustrated in FIG. 8 as those in FIG. 5 are given the same reference numerals.

The stator 10A illustrated in FIG. 8 has the same configuration as that of the stator 10 except that the stator core 13 is changed into a stator core 13A.

The stator core 13A is formed of a dust core and is formed by press-forming the insulating-coated magnetic particles.

Similarly to the stator 10, the stator 10A receives a bolt fastening axial force from the inner circumferential member 33, but the stator core 13A formed of the dust core does not receive a bolt fastening axial force.

Therefore, it is possible to prevent compressive stress due to the bolt fastening from being applied to the stator core 13A, thereby improving the iron loss characteristics of the stator 10A.

Figure 9:
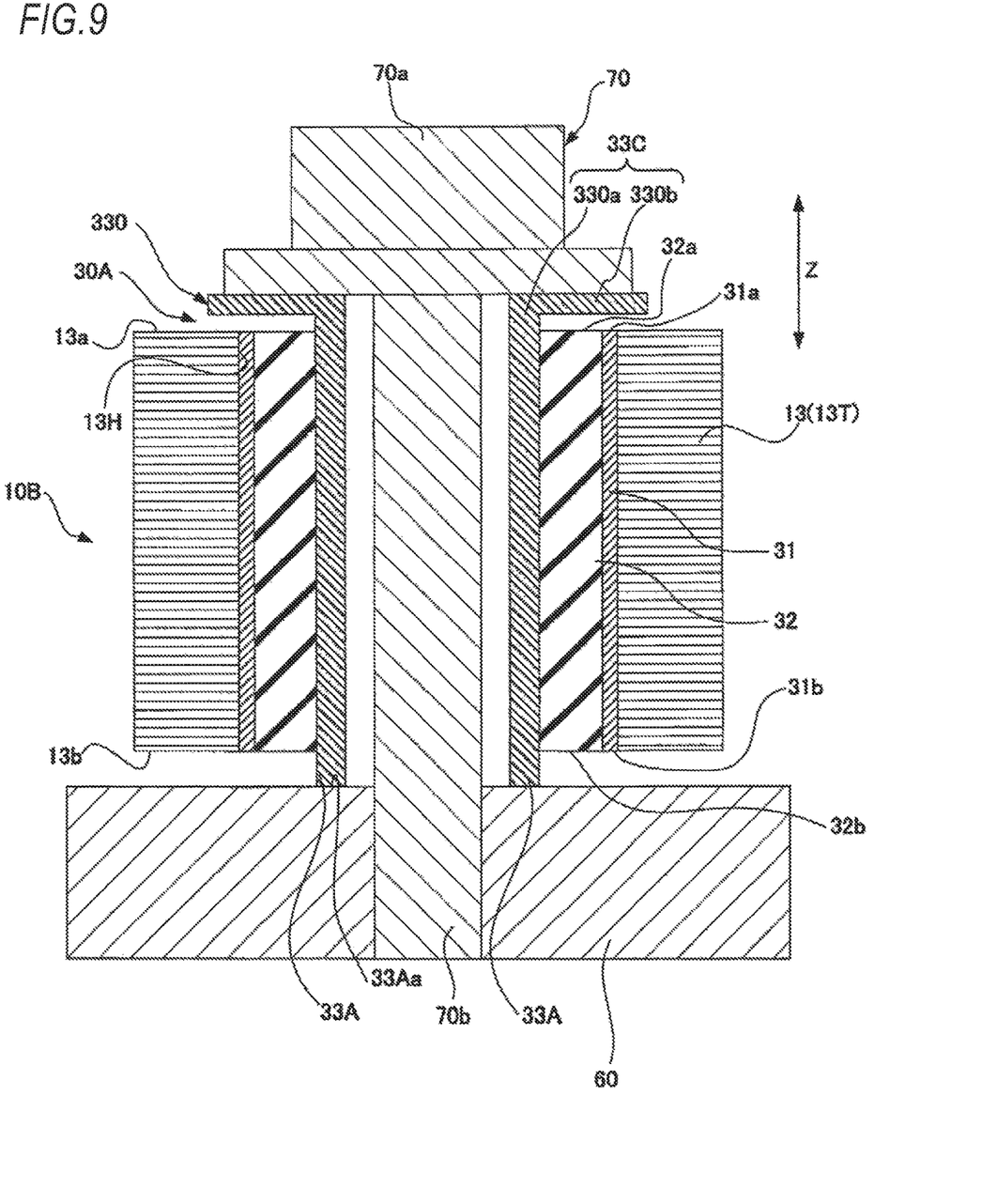
FIG. 9 is a view illustrating another modification example of the stator illustrated in FIG. 1 and corresponding to FIG. 5.

FIG. 9 is a view illustrating a stator 10B, which is another modification example of the stator 10 illustrated in FIG. 1, and corresponding to FIG. 5. The same configurations illustrated in FIG. 9 as those in FIG. 5 are given the same reference numerals.

The stator 10B has the same configuration as that of the stator 10 except that the insertion member 30 in changed into an insertion member 30A. The insertion member 30A has the same configuration as that of the insertion member 30 except that the inner circumferential member 33 is changed into an inner circumferential member 330.

The inner circumferential member 330 has a configuration that the shape of the upper end portion 33B of the inner circumferential member 33 illustrated in FIG. 5 is changed.

An upper end portion 33C on the upper side in the axial direction Z of the inner circumferential member 330 includes a cylindrical portion 330a protruding upwardly in the axial direction from the through hole 13H and a flange 330b protruding outwardly in the radial direction from the outer circumferential portion of the cylindrical portion 330a.

The flange 330b has an outer diameter equal to or longer than that of the elastic member 32. A gap is formed between the flange 330b and the stator core 13, the outer circumferential member 31, and the elastic member 32, so that the flange 330b is non-contact with the stator core 13 and the outer circumferential member 31.

In the insertion member 30A, the upper end surface of the flange 330b in the axial direction Z is located at the same height as the upper end surface of the cylindrical portion 330a in the axial direction Z, and a matching surface of these two end surfaces constitutes a bolt contact surface coming into contact with the bolt head 70a in the fixed state.

According to the stator 10B illustrated in FIG. 9, the same effect can be obtained as that of the stator 10.

In the stator 10B, the inner circumferential member 330 is provided with the flange 330b in the upper end portion 33C, and the outer diameter of the flange 330b is set to be equal to or longer than the outer diameter of the elastic member 32. Therefore, even when the elastic member 32 is peeled off, the flange 330b and the housing 60 can retain the peeled-off elastic member 32 in the through hole 13H. Accordingly, it is possible to prevent the stator 10B from falling off.

The outer diameter of the flange 330b may be smaller than that of the elastic member 32.

Even with this configuration, it is possible to obtain the effect to prevent the peeled-off elastic member 32 form coming off by the flange 330b. Since the outer diameter of the flange 330b is set to be equal to or larger than that of the elastic member 32, it is possible to reliably prevent the elastic member 32 from coming out.

Figure 10:
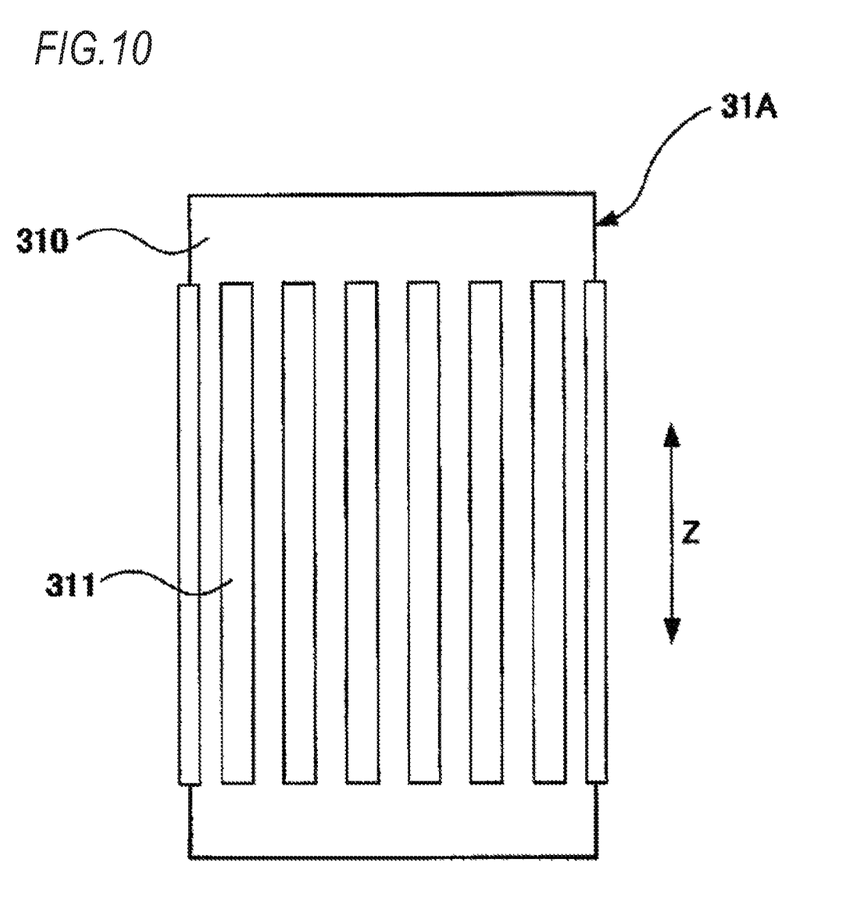
FIG. 10 is a schematic plan view illustrating a modification example of the outer circumferential member illustrated in FIG. 1 when viewed from a direction orthogonal to an axial direction Z.

FIG. 10 is a schematic plan view illustrating an outer circumferential member 31A, which is a modification example of the outer circumferential member 31 of the insertion member 30 illustrated in FIG. 1, when viewed from a direction orthogonal to the axial direction Z.

The outer circumferential member 31A illustrated in FIG. 10 is a cylindrical member and has an outer circumferential surface 310 in which a plurality of convex portions 311 extending in the axial direction Z are formed along the circumferential direction. Instead of the convex portions 311, concave portions extending in the axial direction Z may be formed.

Figure 11:
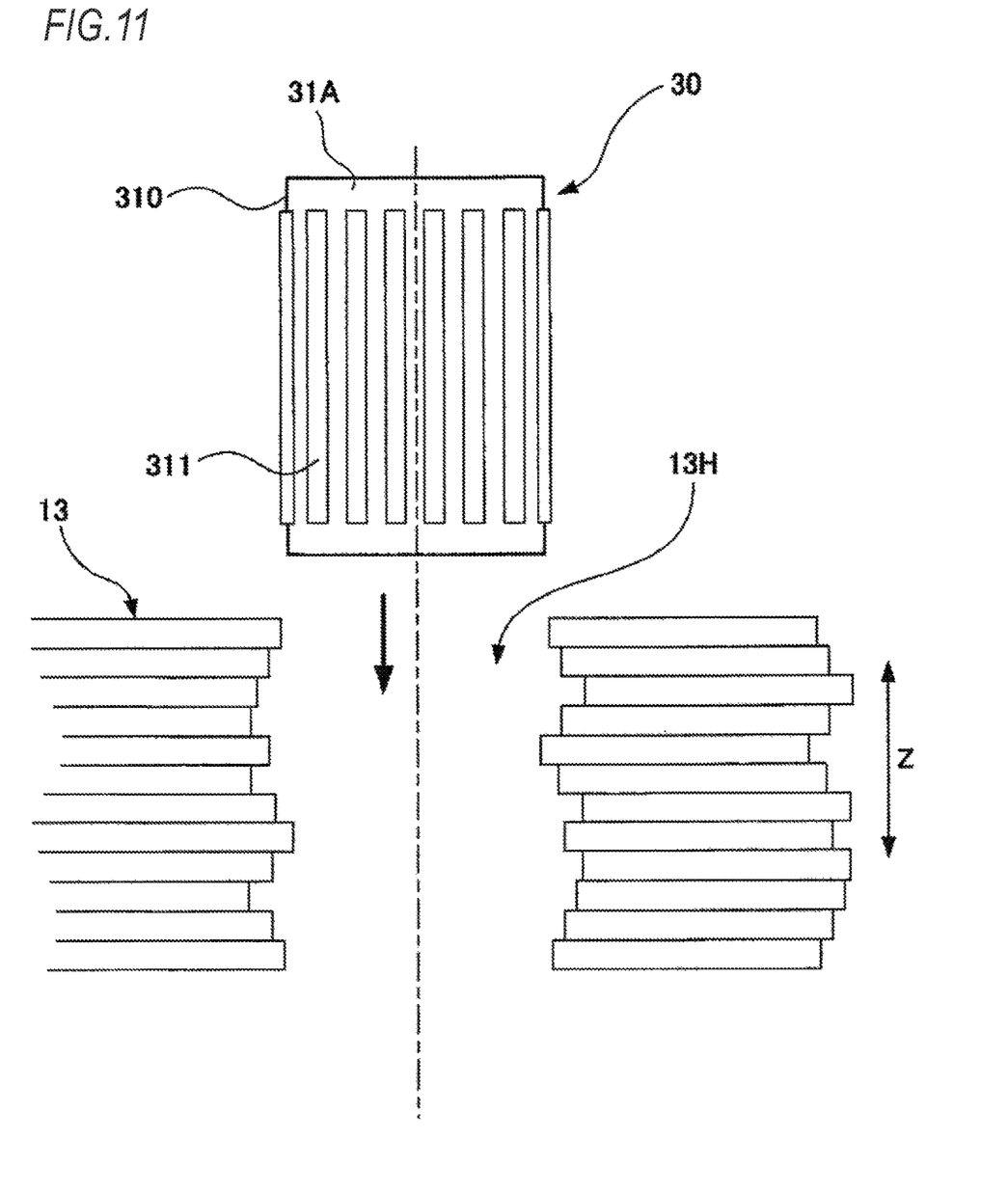
FIG. 11 is a schematic view illustrating a state where an insertion member including an outer circumferential member illustrated in FIG. 10 is inserted into the through hole.

The insertion member 30 including the outer circumferential member 31A as described above is press-fitted into the through hole 13H of the stator core 13 as illustrated in FIG. 11.

Here, the stator core 13 is formed by a stacked body of a plurality of steel sheets, and fine steps are formed which are caused by the positional deviation at the time of joining the plurality of steel sheets or tolerance of each steel sheet or the like on the inner wall of the through hole 13H, as illustrated in FIG. 11.

For this reason, in a state where the insertion member 30 is inserted into the through hole 13H, the outer wall surface of the outer circumferential member 31A and the inner wall surface of the through hole 13H do not come into contact with each other entirely, but come into contact with each other in each part thereof, so that the insertion member 30 is fitted into the through hole 13H.

Therefore, as compared to the case where the outer wall surface of the outer circumferential member 31A and the inner wall surface of the through hole 13H come into contact with each other entirely, it is possible to reduce the compressive stress to be applied to the stator core 13. As a result, it is possible to improve the iron loss characteristics of the stator core 13.

Figure 12:
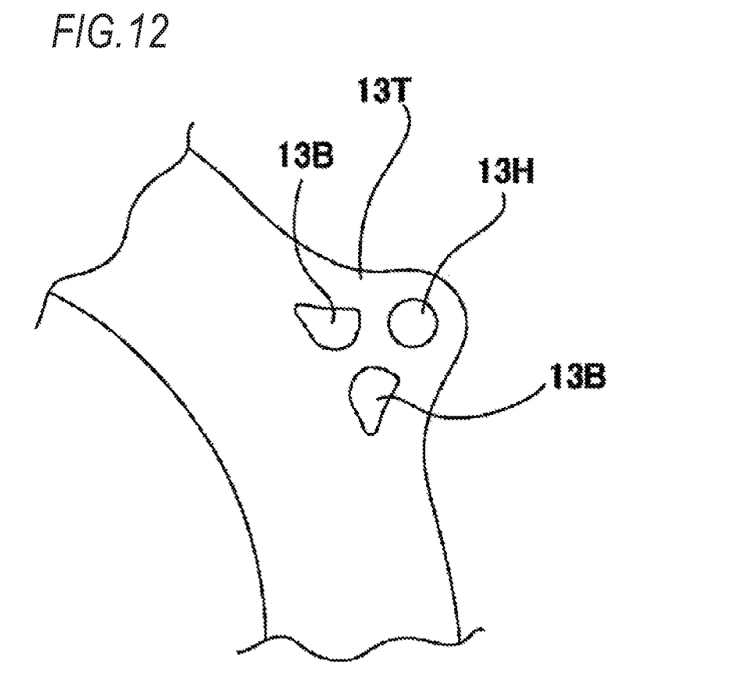
FIG. 12 is a partially enlarged plan view illustrating a modification example of the stator core of the stator illustrated in FIG. 1.

FIG. 12 is a partially enlarged plan view illustrating a modification example of the stator core 13 of the stator 10 illustrated in FIG. 1.

As illustrated in FIG. 12, the stator core 13 is formed with a pair of through holes 13B arranged side by side along the circumferential direction of the stator core 13 between the through hole 13H of the bolt fastening portion 13T and the axial center of the stator core 13.

The pair of through holes 13B are axisymmetric with respect to a straight line connecting the center of the through hole 13H and the axial center of the stator core 13. With these through holes 13B, it is prevented that the magnetic flux flows into the bolt fastening portion 13T.

According to the configuration of the stator core 13 illustrated in FIG. 12, it is possible to reduce the magnetic flux density in the vicinity of the bolt fastening portion 13T, thereby improving the iron loss characteristics. With this effect, in addition to the effect by the insertion member 30 described above, it is possible to further attenuate noise and vibrations caused by the rotary electric machine 1.

The invention is not limited to the above-described embodiment and may be appropriately changed or improved.

For example, the outer circumferential members 31 and 31A, the elastic member 32, and the inner circumferential members 33 and 330 are formed as a cylindrical member, respectively. However, they may be a cylindrical member having a square cylindrical shape or the like.

In addition, the through hole 13H is formed in a cylindrical shape, however, it may be formed in a shape matching with the shape of the outer circumferential members 31 and 31A.

What is claimed is:

1. A stator of a rotary electric machine to be fixed to a housing with a bolt, comprising:
   an annular stator core;
   a through hole provided in the stator core along an axial direction of the stator; and
   a insertion member having a cylindrical shape, the insertion member being fitted into the through hole and has an insertion space, through which the bolt passes, wherein:
   the insertion member includes:
      an outer circumferential member having a cylindrical shape, to be fitted into the through hole;
      an inner circumferential member, having a cylindrical shape, including a hollow portion forming the insertion space; and
      an elastic member provided between the outer circumferential member and the inner circumferential member;
   a first end portion on one side in the axial direction of the inner circumferential member further protrudes in the axial direction compared to end surfaces on one side in the axial direction of the outer circumferential member and the stator core, and comes into contact with the housing in a state where the stator is fixed to the housing;
   a second end portion on the other side in the axial direction of the inner circumferential member further protrudes in the axial direction compared to end surfaces on the other side in the axial direction of the outer circumferential member and the stator core, and comes into contact with a bolt head of the bolt in a state where the stator is fixed to the housing;
   a space is formed between the housing and the stator core and the outer circumferential member;
   a space is formed between the bolt head and the stator core and the outer circumferential member; and
   the bolt head, the housing and the inner circumferential member do not come into contact with both end faces in the axial direction of the stator core and the outer circumferential member.

2. The stator of the rotary electric machine according to claim 1, wherein
   a length of the inner circumferential member in the axial direction is set to be longer than that of the elastic member in the axial direction.

3. The stator of the rotary electric machine according to claim 2, wherein
   the second end portion of the inner circumferential member includes a cylindrical portion and a flange protruding outwardly in a radial direction from an outer circumferential portion of the cylindrical portion and being in non-contact with the stator core and the outer circumferential member.

4. The stator of the rotary electric machine according to claim 3, wherein
   an outer diameter of the flange is set to be equal to or larger than that of the elastic member.

5. The stator of the rotary electric machine according to claim 1, wherein
   the stator core is formed of a stacked body of a plurality of steel sheets.

6. The stator of the rotary electric machine according to claim 5, wherein
   an outer circumferential surface of the outer circumferential member is formed with a plurality of convex portions or concave portions extending in the axial direction along a circumferential direction.

7. The stator of the rotary electric machine according to claim 1, wherein:
   the stator core includes a plurality of through holes and a plurality of insertion members; and
   a number of the insertion members is less than a number of the through holes.

* * * * *